July 8, 1924.

C. SONNER

VALVE

Filed March 29, 1921

WITNESSES
William P. Goebel.
P. H. Pattison

INVENTOR
CARL SONNER
BY Munn & Co
ATTORNEYS

July 8, 1924.
C. SONNER
VALVE
Filed March 29, 1921
1,500,775
2 Sheets-Sheet 2
Fig.3.
Fig.4.
Fig.5.
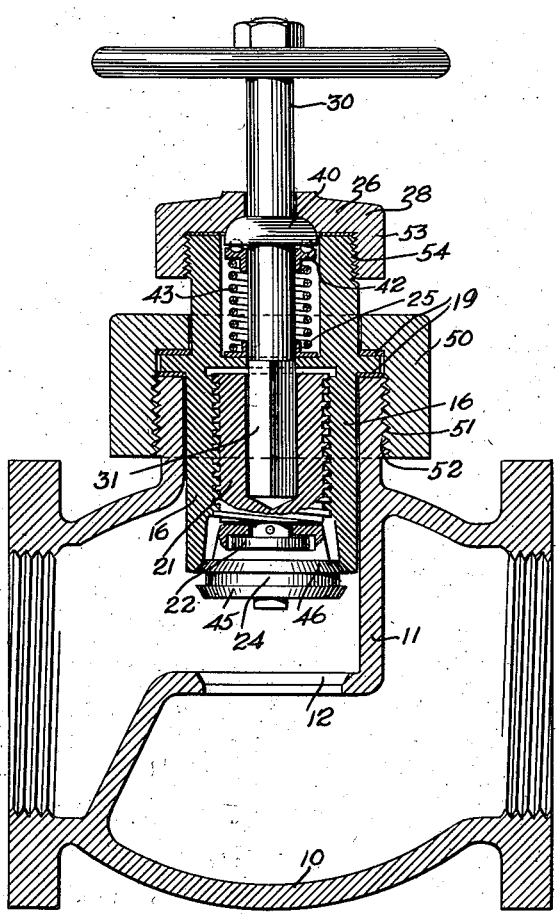
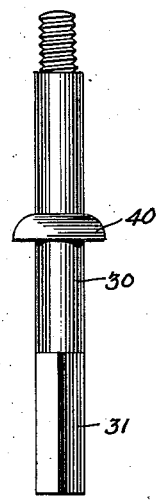
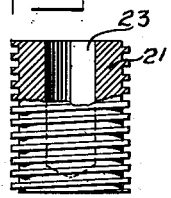
WITNESSES
William P. Goebel.
P. H. Pattison.
INVENTOR
CARL SONNER
BY
ATTORNEYS Patented July 8, 1924.

1,500,775

UNITED STATES PATENT OFFICE.

CARL SONNER, OF NEW YORK, N. Y., ASSIGNOR TO PETER BERDAR, OF QUEENS, NEW YORK.

VALVE.

Application filed March 29, 1921. Serial No. 456,617.

*To all whom it may concern:*

Be it known that I, CARL SONNER, a citizen of the United States, and a resident of the city of New York, borough of Manhattan, in the county and State of New York, have invented a new and Improved Valve, of which the following is a full, clear, and exact description.

The present invention relates to new and useful improvements in valves, and it pertains more particularly to steam valves.

It is one of the objects of the invention to construct a valve in such a manner that when the valve is in open position, an escape of steam will be prevented.

It is a further object of the invention to provide an annular shoulder or collar acting in conjunction with the valve, said annular shoulder serving to prevent the escape of steam when the valve is open.

It is a further object of the invention to so construct the valve that the annular shoulder may be removed for the purpose of grinding, without closing the steam line.

It is a further object of the invention to so construct a valve of this character that the use of packing commonly employed is dispensed with.

It is a still further object of the invention to provide a new and novel operating means for valves of this general type.

It is a further object of the invention to provide a new and novel form of valve and valve-operating mechanism which is capable of use with an operation as an attachment to old and previously used valve bodies of globe, gate and various other types.

With the above and other objects in view, reference is had to the accompanying drawing, in which—

Fig. 3 is a vertical sectional view of a modified form of valve;

Fig. 4 is a detail elevational view of one of the valve elements, and

Fig. 5 is a detail view of a portion of the operating mechanism.

Figure 1:
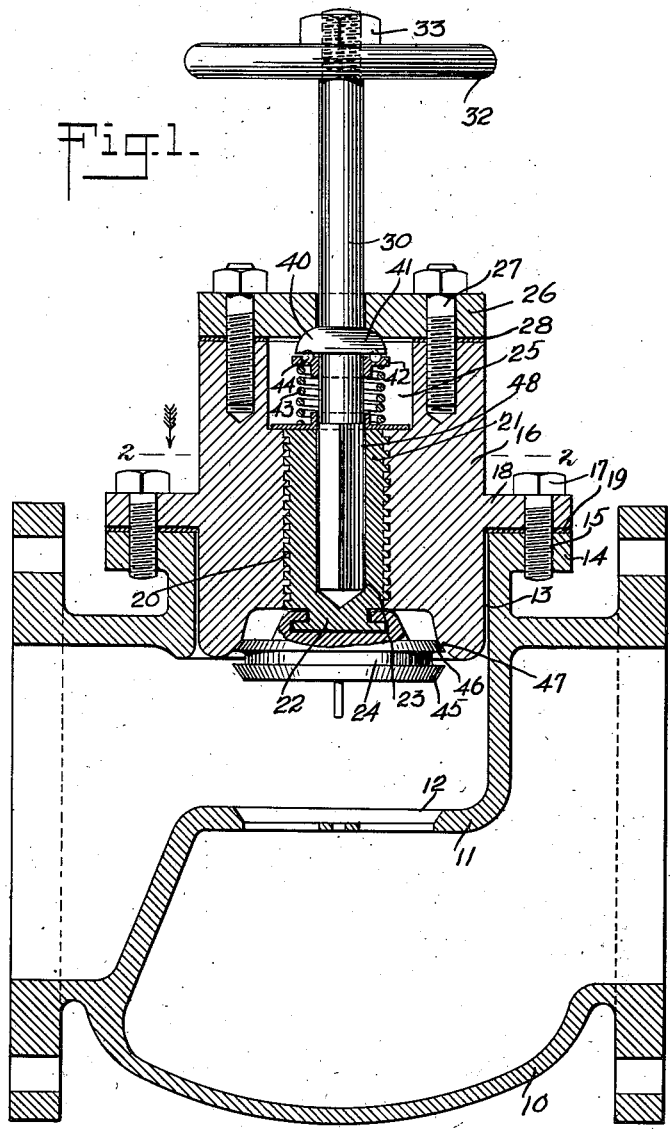
Figure 1 is a vertical sectional view of a valve constructed in accordance with the present invention.
Figure 2:
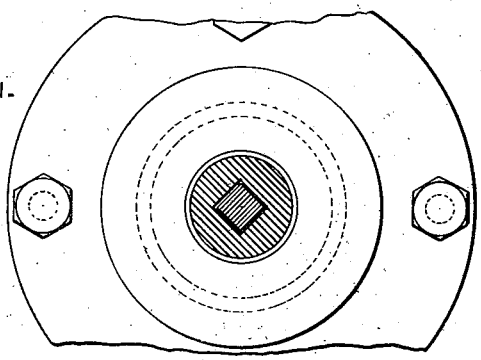
Fig. 2 is a horizontal sectional view taken on the line 2—2 of Fig. 1.

Referring more particularly to the drawings, the reference character 10 designates the main housing of a valve and said housing is provided with a partition 11 in which partition is formed a valve seat 12 in the ordinary manner. The upper portion of the valve housing 10 is provided with an opening 13, and said opening is defined by an annular flange 14 provided with a plurality of spaced perforations 15. The reference character 16 designates a gland or bonnet adapted to be secured within the opening 13 by means of bolts 17 adapted for engagement with the threaded perforations 15 in the flange 14, it being understood that the gland 16 is provided with an annular flange 18, through which the bolts 17 are adapted to pass. The reference character 19 designates a gasket adapted to be interposed between the flanges 14 and 18 to form a tight joint therebetween.

The gland 16 heretofore mentioned is provided with an internally screw-threaded central opening 20, and mounted in said central opening 20 and having engagement with the threads thereof, is a sleeve 21. This sleeve 21 is provided on its lower end with a head portion 22 and said sleeve is hollowed out to provide a squared recess 23 extending throughout the major portion of the sleeve. The reference character 24 designates the valve, and said valve is secured to the head member 22 in such a manner that the same will be loosely carried thereby. The upper portion of the gland 16 is cut out to form a recess 25, and said recess is adapted to be closed by means of a cap plate 26 secured in position by means of bolts 27, a suitable packing 28 being interposed between said cap plate and the upper edge of the gland 16.

The reference character 30 designates the valve stem and said stem is provided with a squared lower end 31, adapted to be received within the recess 23 of the sleeve 21 in such a manner that as the stem 30 is turned, the sleeve 21 will be turned in order that it may move longitudinally of the gland 16 due to its threaded engagement with the passage 20 thereof. To provide for turning the valve stem 30, a hand wheel 32 is secured to the upper end thereof, by means of a nut 33 in the ordinary manner. This valve stem is provided intermediate of its ends with an annular shoulder or collar 40, preferably formed integral therewith, and said annular shoulder 40 is adapted to engage a seat 41 formed upon the under side of the cap plate 26. Resting upon the bottom of the recess 25 is a collar plate 48. Slidably mounted upon the valve stem 30, is a collar 42 situated in the recess 25 and interposed between the collar plate 48 on the bottom wall of the recess 25 and the collar 42, is a coil spring 43. The collar 42 is provided with a raceway, and interposed between said collar 42 and the annular shoulder 40, are roller bearings 44, which serve to permit of easy rotation of the valve stem 30.

The valve 24 heretofore mentioned is provided with a lower seat 45 and an upper seat 46, the upper seat 46 being adapted to engage a valve seat 47 formed in the lower end of the gland 16, while the lower seat 45 is adapted to engage the valve seat 12 in the partition 11.

The device operates in the following manner:

When the lower seat 45 of the valve 24 is engaged with the seat 12 in the partition 11, the valve will be closed. When the seats are disengaged, the valve will be open and a passage of steam will be permitted through the partition 11. With the valve in open position any leakage of steam around the sleeve 21 would be prevented from escaping from the valve by reason of the engagement of the annular shoulder 40 with the seat 41 in the lower face of the cap plate 26, it being understood that this annular shoulder 40 is engaged with the seat 41 at all times by means of the coil spring 43, the stem 30 being slidably mounted with respect to said sleeve 21.

Should the annular shoulder and the seat 41 need regrinding, it is only necessary to move the valve 24 until its upper seat 46 engages the seat 47 in the lower end of the gland 16. With the parts in this position, the steam is prevented from passing around the exterior of the sleeve 21, and the cap plate 26 together with the stem 30 and the spring 43 may be removed in order that the annular shoulder 40 and its seat 41 may be reground.

In that form of the invention shown in Fig. 3, the gland 16 is retained in position by means of a cap 50, said cap being internally screw-threaded as at 51 and adapted to engage the screw-threaded extension 52 of the valve housing 10. In this form of the invention, the cap plate 26 is provided with an annular flange 53 internally screw-threaded for engagement with the externally screw-threaded end 54 of the gland 16. In this figure, the invention is shown as applied to valves which are adapted to be used under normally low pressures, while the valve shown in Fig. 1 is adapted for use with steam lines of high pressure.

I claim:

In a valve, a housing having a beveled valve seat, a gland secured in the housing and having recessed ends and a screw threaded opening connecting the recessed ends the recess at the lower end of the gland being provided with a beveled valve seat within the same, a cap secured to the upper end of the gland and provided with an opening having its inner end enlarged to form a seat, an externally threaded sleeve in the threaded opening of the gland and having a polygonal longitudinal opening, the threaded portions of the sleeve and gland being of the same length, a valve loosely mounted on the lower end of the sleeve and having beveled upper and lower seating surfaces adapted to alternately engage the valve seats of the housing and gland, a valve stem mounted in the cap and having a polygonal inner end engaging in the polygonal opening of the stem, an annular shoulder fixedly secured to the valve stem having an outer face adapted to seat on the seat of the cap, a collar plate resting on the bottom of the upper recess of the gland and through which the valve stem passes, a collar loosely mounted on the valve stem below said annular shoulder, roller bearings between the collar and the shoulder, and a coil spring surrounding the valve stem between the collar and collar plate.

CARL SONNER.